United States Patent
Wieber et al.

(10) Patent No.: US 10,688,718 B2
(45) Date of Patent: Jun. 23, 2020

(54) PRODUCTION AND USE OF POROUS BEAD POLYMERS IN 3D PRINTING USING THE BINDER JETTING METHOD

(71) Applicant: Evonik Röhm GmbH, Darmstadt (DE)

(72) Inventors: Stephan Wieber, Karlsruhe (DE); Dirk Poppe, Frankfurt am Main (DE); Stefan Bernhardt, Offenbach (DE); Markus Pridöhl, Grosskrotzenburg (DE); Sven Balk, Frankfurt (DE); Christian Meier, Darmstadt (DE); Senada Schaack, Frankfurt am Main (DE); Thomas Hasskerl, Kronberg (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/337,238

(22) PCT Filed: Sep. 11, 2017

(86) PCT No.: PCT/EP2017/072673
§ 371 (c)(1),
(2) Date: Mar. 27, 2019

(87) PCT Pub. No.: WO2018/059912
PCT Pub. Date: Apr. 5, 2018

(65) Prior Publication Data
US 2019/0299520 A1 Oct. 3, 2019

(30) Foreign Application Priority Data
Sep. 28, 2016 (EP) .................................. 16190993

(51) Int. Cl.
| | |
|---|---|
| B29C 64/165 | (2017.01) |
| B33Y 10/00 | (2015.01) |
| B33Y 70/00 | (2020.01) |
| C09D 133/12 | (2006.01) |
| B29K 105/04 | (2006.01) |
| B29K 105/00 | (2006.01) |

(52) U.S. Cl.
CPC .......... B29C 64/165 (2017.08); C09D 133/12 (2013.01); *B29K 2105/045* (2013.01); *B29K 2105/251* (2013.01); *B33Y 10/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 2015/0030493 A1* | 1/2015 | Scott ....................... | A61L 27/56 419/2 |
| 2015/0054195 A1 | 2/2015 | Greyf | |
| 2015/0158249 A1* | 6/2015 | Goto ....................... | B33Y 10/00 264/40.1 |
| 2015/0344682 A1 | 12/2015 | Ganapathiappan et al. | |
| 2016/0040003 A1 | 2/2016 | Nelliappan et al. | |
| 2016/0083589 A1 | 3/2016 | Ganapathiappan et al. | |
| 2016/0200045 A1* | 7/2016 | Hopkins ................. | B22F 7/002 428/550 |
| 2016/0312037 A1* | 10/2016 | Zhao ....................... | C08L 77/02 |
| 2017/0113411 A1* | 4/2017 | Watanabe ............... | A61K 6/891 |
| 2017/0252974 A1* | 9/2017 | Ng ........................ | B29C 64/165 |
| 2019/0111479 A1* | 4/2019 | Kasperchik ............. | B22F 3/008 |
| 2019/0126542 A1 | 5/2019 | Poppe et al. | |
| 2019/0127598 A1 | 5/2019 | Bernhardt et al. | |

FOREIGN PATENT DOCUMENTS

| | | |
|---|---|---|
| CN | 105 440 199 | 3/2016 |
| DE | 10 2007 025656 | 2/2008 |
| DE | 10 2007 061 445 | 6/2009 |

OTHER PUBLICATIONS

English language translation of the International Search Report for corresponding PCT/EP2017/072673, filed Sep. 11, 2017.
English language translation of the Written Opinion of the International Searching Authority for corresponding PCT/EP2017/072673, filed Sep. 11, 2017.
English language translation of the International Preliminary Report on Patentablility for corresponding PCT/EP2017/072673, filed Sep. 11, 2017.
European Search Report and Search Opinion for corresponding European application 16 19 0993, filed Sep. 28, 2016.
English language translation of the International Search Report for PCT/EP2017/057909, filed Apr. 4, 2017 which is the international application corresponding to copending U.S. Appl. No. 16/092,996.

(Continued)

*Primary Examiner* — Mary Lynn F Theisen
(74) *Attorney, Agent, or Firm* — Law Office of: Michael A. Sanzo, LLC

(57) ABSTRACT

The present invention relates to the technical field of 3D printing, especially in the form of the binder jetting method, in which particulate material in a powder bed is bonded by means of a printed adhesive to form a three-dimensional object. The particulate materials may be inorganic materials, for example sand or a metal powder, or particulate polymeric materials, for example polymethacrylates or polyamides. For this purpose, polymethacrylates may take the form, for example, of suspension polymers, called bead polymers.

The present invention relates to the use of porous particles in the binder jetting process, in particular of porous suspension polymers. These powders for 3-D printing differ from the prior art in that the porosity results in a faster and better absorption of the printed binder by the powder particles. A great advantage of this procedure is additionally that a product with less warpage is formed and that the end product has a better surface appearance.

15 Claims, No Drawings

(56) References Cited

OTHER PUBLICATIONS

English language translation of the Written Opinion of the International Searching Authority for PCT/EP2017/057909, filed Apr. 4, 2017, which is the international application corresponding to copending U.S. Appl. No. 16/092,996.
English language translation of the International Preliminary Report on Patentability for PCT/EP2017/057909, filed Apr. 4, 2017, which is the international application corresponding to copending U.S. Appl. No. 16/092,996.
European Search Report for EP 16 16 4854 filed Apr. 12, 2016, which is the European application corresponding to copending U.S. Appl. No. 16/092,996.
English language translation of the European Search Opinion for EP 16 16 4854 filed Apr. 12, 2016, which is the European application corresponding to copending U.S. Appl. No. 16/092,996.
English language translation of the International Search Report for PCT/EP2017/058796 filed Apr. 12, 2017, which is the international application corresponding to copending U.S. Appl. No. 16/094,879.
English language translation of the Written Opinion of the International Searching Authority for PCT/EP2017/058796 filed Apr. 12, 2017, which is the international application corresponding to copending U.S. Appl. No. 16/094,879.
English language translation of the International Preliminary Report on Patentability for PCT/EP2017/058796 filed Apr. 12, 2017, which is the international application corresponding to copending U.S. Appl. No. 16/094,879.
European Search Report for EP 16 16 6134 filed Apr. 20, 2016, which is the European application corresponding to copending U.S. Appl. No. 16/094,879.
English language translation of the European Search Opinion for EP 16 16 6134 filed Apr. 20, 2016, which is the European application corresponding to copending U.S. Appl. No. 16/094,879.
Dubinsky, et al., "Hybrid porous material produced by polymerization-induced phase separation," *Chem. Commun.* 46:2578-2580 (2010).
Dubinsky, et al., "Toward Controlling the Surface Morphology of Macroporous Copolymer Particles," *Macromolecules* 42:1990-1994 (2009).
Gomez, et al., "Effects of Experimental Variables on the Synthesis of Porous Matrices," *Journal of Applied Polymer Science* 79:920-927 (2001).
Horák, et al., "Porous PolyHEMA Beads Prepared by Suspension Polymerization in Aqueous Medium," *Journal of Applied Polymer Science* 49:2041-2050 (1993).
Okay, et al., "Synthesis and Formation Mechanism of Porous 2-Hydroxyethyl Methacrylate-Ethylene Glycol Dimethacrylate Copolymer Beads," *Journal of Applied Polymer Science* 46:401-410 (1992).
Presser, Jonas, "Neue Komponenten für das generative Fertigungsverfahren des 3D-Drucks," Dissertation (2012); retrieved from the internet: http://tuprints.ulb.tu-darmstadt.de/2963/, with English language machine translation of abstract.
Svec, et al., "New Designs of Macroporous Polymers and Supports: From Separation to Biocatalysis," *Science* 273(5272):205-211 (Jul. 1996).
U.S. Appl. No. 16/092,996, filed Oct. 11, 2018, US-2019/0126542 A1, May 2, 2019, Poppe.
U.S. Appl. No. 16/094,879, filed Oct. 18, 2018, US-2019/0127598 A1, May 2, 2019, Bernhardt.
Non final Office Action for copending U.S. Appl. No. 16/094,879, dated Feb. 24, 2020.
Notice of Allowance for copending U.S. Appl. No. 16/092,996, dated Feb. 25, 2020.
Mostafaei, et al., "Powder bed binder jet printed alloy 625: Densification, microstructure and mechanical properties," *Materials and Design* 108:126-135 (Jun. 2016).

\* cited by examiner

PRODUCTION AND USE OF POROUS BEAD POLYMERS IN 3D PRINTING USING THE BINDER JETTING METHOD

CROSS REFERENCE TO RELATED APPLICATIONS

The present application is US national stage of international application PCT/EP2017/072673, which had an international filing date of Sep. 11, 2017, and which was published on Apr. 5, 2018. Priority is claimed to European application EP 16190993.2, filed on Sep. 28, 2016.

FIELD OF THE INVENTION

The present invention relates to the technical field of 3D printing, especially in the form of the binder jetting process, in which particulate material in a powder bed is bonded by means of a printed adhesive to form a three-dimensional object. The particulate materials may be inorganic materials, for example sand or a metal powder, or particulate polymeric materials, for example polymethacrylates or polyamides. For this purpose, polymethacrylates may take the form, for example, of suspension polymers, called bead polymers.

The present invention relates to the use of porous particles in the binder jetting process, in particular of porous suspension polymers. These powders for 3-D printing differ from the prior art in that the porosity results in a faster and better absorption of the printed binder by the powder particles. A great advantage of this procedure is additionally that a product with less warpage is formed and that the end product has a better surface appearance.

PRIOR ART

Binder jetting is an additive production process which is also known by the term "3D inkjet powder printing", which gives a good description of the process. This process involves applying a liquid binder, for example by means of a standard inkjet printhead, to a powder layer and hence selectively bonding a portion of this powder layer together. The application of new powder layers which alternates with this application ultimately results in formation of a three-dimensional product. In binder jetting, it is possible to use various materials as binders and as powder material. Suitable powder materials are, for example, polymer particles, sand, ceramic particles or metal powders each having a diameter between 10 and a few hundred μm. In the case of use of sand, there is usually no need for aftertreatment of the finished article. In the case of other materials, for example the polymer powders including PMMA, subsequent curing, sintering and/or infiltration of the article may be necessary. However, such subsequent processing is actually undesirable since it is time-consuming and/or costly and, because of shrinkage that often occurs, can lead to an adverse effect on dimensional stability.

The binder is generally applied in an analogous manner to conventional two-dimensional paper printing. Examples of binder systems are liquid vinylic monomers which are cured by means of peroxides present in the powder material. Alternatively or additionally, the powder material comprises a catalyst which accelerates curing or actually enables it at the ambient temperature.

Examples of such a catalyst for acrylate resins or monomers with peroxides as initiator include amines, especially secondary amines.

Binder jetting has great advantages over other 3D printing processes such as FDM, SLS or stereolithography which are all based on melting or welding of the material that forms the product. For instance, this process has the best suitability among all known processes for directly realizing coloured objects without subsequent colouring. This process is also especially suitable for producing particularly large articles. For instance, products up to the size of a room have been described. Furthermore, other processes are also very time consuming. Apart from any necessary aftertreatment, binder jetting can even be considered to be particularly time-efficient compared to the other processes.

Furthermore, binder jetting has the great advantage over other processes that it is effected without supply of heat. In the case of processes effected by means of melting or welding, this inhomogeneous introduction of heat gives rise to stresses in the product, which usually have to be dissipated again in subsequent steps such as a thermal aftertreatment, which means further expenditure of time and costs.

A disadvantage of binder jetting is the process-related porosity of the product. Thus, for example, measurement of tensile strength yields a value only about 5% of that of an injection moulded moulding made of a comparable material. Because of this disadvantage, binder jetting has to date been used predominantly for production of decorative articles or for casting sand moulds. The porosity arises particularly from the fact that only some of the cavities between the particles are filled by the binder in known printing processes. This is an inevitable result of the low viscosity of the liquid binder applied by printing. Should more be applied, this runs into neighbouring particles or cavities between the particles (called interstices) directly before and also during the commencement of curing. This in turn leads to an imprecise, unclean print and to a low surface accuracy in the finished article.

Plastic components produced by the binder jetting process have to date been employed primarily for casting sand moulds. Improvement of the mechanical properties of products of the process could allow the stability of the moulded articles to be improved to an extent sufficient to allow their use as functional parts.

In binder jetting an inkjet printing head moves selectively across a powder bed and prints the liquid binder material precisely at the locations that are to be consolidated. One example of consolidation is the reaction between liquid vinylic monomers in the ink and peroxides present in the powder. The reaction is accelerated by a catalyst, for example based on an amine, to such an extent that it takes place at room temperature. The process is repeated layer-by-layer until the finished moulding has been produced. Once the printing process has ended, the moulding can be removed from the powder bed and optionally introduced into a post-treatment procedure.

Polymer powders based on suspension polymers have been used hitherto. The size of the polymer particles is generally from some tens of micrometres to some hundreds of micrometres. These particles feature good powder-flowability, do not cake, and give good results from application in the form of powder bed. If polymer particles comprising peroxides are used, it is easy to achieve reaction with the (meth)acrylate-containing binder.

J. Presser, in his thesis "Neue Komponenten für das generative Fertigungsverfahren des 3D-Drucks" (TU Darmstadt, 2012), describes the use of precipitated emulsion polymers in powder form for the binder jetting process. These emulsion polymers are to some extent successful in filling the interstices between the actual particles, and thus reduce porosity. However, workup by coagulation, drying and sieving leads to non-round secondary particles of irregular size distribution. Moreover, it has been found that the emulsion polymers used in this way barely increase the bulk density and do not have any significant effect in relation to the stability of the printed object.

Problem

The problem addressed by the present invention was that of accelerating the binder jetting process by achieving faster adhesion of the particles to one another in the powder bed and also ensuring that the end product of the printing procedure exhibits a better surface quality without time-consuming aftertreatment of the product being required.

A further problem addressed was that of improving the mechanical stability of products of a binder jetting process, especially those based on a polymer powder, especially a PMMA powder, such that they can be used as functional components.

A particular problem addressed in this connection was that of realizing mouldings having at least a tensile strength 25 MPa. "Analogous" means here by way of example that a PMMA injection moulding is compared with a binder jetting product based on a PMMA powder.

Other problems that are not mentioned explicitly may become apparent from the description, the examples or the claims of the present application, or from the overall context thereof.

Solution

Surprisingly, these objects were achieved by means of a novel process for the production of three-dimensional objects from a powder bed by means of a binder jetting process. In this process the three-dimensional object is formed by multiple repetition of the process steps a) selective application of a binder to the surface of a powder bed and subsequent or simultaneous hardening of this binder in the powder bed and b) application of a new powder layer on the surface of the powder bed.

According to the invention the powder bed comprises at least one type of porous polymer particles, wherein these porous particles have an average diameter between 10 and 500 μm and a porosity of between 5 and 20 vol % of pores.

According to the invention the porous polymer particles are used as powder material in the power bed in the binder jetting process. Upon printing with a binder, namely a liquid, for example solvent and or reactive binder, for example a monomer mixture, which may optionally comprise further components, a larger surface is available for binding. This makes it possible to improve the mechanical properties. When the binder system is a reactive binder this may form an interpenetrating network.

An interesting and very surprising effect of the present invention is that despite the use of porous particles it simultaneously achieves the advantage in the printed end product that a lower porosity and thus a higher mechanical stability is attained in said end product. This is surprisingly explained by better absorption of the binder by the porous particles and thus better adhesion between the particles. It is thus possible to use more binder in the actual printing process without losing dimensional accuracy. The faster absorption and the greater amount of binder thus suprisingly also results in better filling of the interstices between the particles, thus even resulting in a porosity that is lower overall compared to inkjet 3D printing of the prior art.

Use of the process according to the invention surprisingly afforded products having a tensile strength of 25 MPa (according to DIN ISO 527-1) or more. Just as surprisingly, prints having about 50% of the modulus of tensile elasticity of an anologous injection moulded part, or even slightly more, were produced. Compared to the prior art in this printing technology this is a clear advancement not to be expected in such clarity. The measurements were taken on standard test pieces for tensile tests which were printed by means of a process according to the invention.

It is preferable when the porous particle is a polymer particle comprising an initiator suitable for hardening the binder or a catalyst or accelerator that accelerates hardening. The initiators mentioned may, for example, be peroxides or azo initiators that are common knowledge to those skilled in the art. The accelerators are by way of example compounds which, in combination with an initiator, which in turn per se has a relatively high decomposition temperature, lower the decomposition temperature of this initiator. This allows curing to begin at a temperature as low as ambient temperature in the printer, or during a heat-conditioning step extending to 50° C. Examples of a suitable initiator with high decomposition temperature here would be secondary or tertiary, mostly aromatic amines. Catalysts mentioned can have a corresponding or similar activating effect.

However, it is generally a simple matter for those skilled in the art to select the precise composition of the initiator system.

It is particularly preferable when the polymer particle is a PMMA suspension polymer having an average diameter between 25 and 150 μm, preferably between 30 and 110 μm and particularly preferably between 35 and 100 μm. It is particularly preferable when the suspension polymers are PMMA or are MMA copolymers. To this end, the comonomers can be selected by way of example from the group of the acrylates, methacrylates and styrene.

The advantage of a porous powder bed material compared to other solutions, for example an aggregated accumulation of small particles in the powder bed, is the enduring stability of the porous particles as a powder with the simultaneous advantage of high ink absorption and thus ultimately the obtainment of a compact component having improved mechanics.

Suitable monomers for such a suspension polymer may include both monofunctional (meth)acrylates and difunctional/polyfunctional (meth)acrylates for example. Such a difunctional/polyfunctional (meth)acrylate may comprise identical or different functional groups. It is moreover preferable to employ crosslinkers since these further stabilize the porous powder. Other suitable monomers may include for example aryldienes, for example divinylbenzene, alkyldienes, for example Octadiene, or alkylaryldienes.

The porous particles for use in the powder bed may be produced by different variants. These variants include for example introduction of at least one blowing agent, at least one pore former and/or at least one emulsion polymer into one or more monomers of the monomer mixture to produce the particles.

It is preferable when at least one crosslinking monomer is present which admixed with at least one polymerization initiator and optionally further customary additives and dispersed and polymerized in an aqueous phase. The pore structure is is generated during the polymerization or by at least one downstream step.

The downstream step may comprise dissolving/washing, leaching or decomposition of the pore former, blowing agent or emulsion polymer.

In a first preferred embodiment of the present invention the porous particles are produced by means of a suspension polymerization in which the monomer mixture comprises a blowing agent. The blowing agent may be for example an alkane, a cycloalkane, an alcohol, an aldehyde, a ketone or another organic substance. The blowing agent preferably has a boiling point between 30° C. and 80° C. under standard conditions.

When the blowing agent is an alkane it may in particular be an aliphatic or cyclic alkane. In a particular variant of the present invention the pore former is a porogen, for example cyclohexanol or cyclohexane, which may also be washed out to achieve pore formation.

Alternatively to the use of blowing agents having rather low boiling points it is also possible to employ as a second type of blowing agent compounds which at a temperature above 80° C. decompose and thus liberate volatile constituents. Naturally in such a variant the suspension polymerization is performed at a temperature below this decomposition temperature. Particularly suitable examples for these decomposing compounds are isobutyl or tert-butyl (meth)acrylate which are copolymerized with the monomer mixture in the suspension polymerization.

Irrespective of the type of blowing agent it has additionally proved advantageous when the monomer mixture further comprises a nucleating agent, for example very small inorganic particles.

The second variant for producing the porous particles is characterized in that said particles are produced by means of suspension polymerization, wherein the monomer mixture comprises non-crosslinked emulsion polymers having a diameter between 10 and 200 nm, preferably between 20 and 100 nm, and in that the monomer mixture preferably comprises at least one crosslinker.

In this process after isolation of the particles the emulsion polymer can then be leached out of the polymer particle by means of an organic solvent with accompanying pore formation. The emulsion polymer is particularly preferably an emulsion polymer having a glass transition temperature, measured by means of DSC, between 30° C. and 70° C.

Finally, a third variant is characterized in that the porous particles are produced by means of suspension polymerization, wherein the monomer mixture comprises wax particles having a diameter between 10 and 100 nm, and in that the monomer mixture comprises at least one crosslinker.

Irrespective of the variant the monomer mixture should comprise crosslinkers and said mixture thus preferably comprises between 0.1 and 10 wt %, particularly preferably between 1 and 5 wt %, of crosslinkers. Particularly preferred crosslinkers are di- or tri(meth)acrylates or allyl (meth) acrylate.

According to the invention glass transition temperatures reported are measured by means of DSC (differential scanning calorimetry) unless otherwise stated. In this regard, those skilled in the art are aware that DSC is only sufficiently conclusive when, after a first heating cycle up to a temperature which is a minimum of 25° C. above the highest glass transition or melting temperature but at least 20° C. below the lowermost breakdown temperature of a material, the material sample is kept at this temperature for at least 2 min. Thereafter, the sample is cooled back down to a temperature at least 20° C. below the lowermost glass transition or melting temperature to be determined, where the cooling rate should be not more than 20° C./min, preferably not more than 10° C./min. After a further wait time of a few minutes, the actual measurement is effected, in which the sample is heated at a heating rate of generally 10° C./min or less up to at least 20° C. above the highest melting or glass transition temperature. The respective highest and lowest temperature limits can be roughly predetermined in simple preliminary measurements with a separate sample.

The particle sizes were measured to DIN ISO 13321: 2004-10, based on the identical wording adopted from the international standard ISO 13321:1996, by means of an N5 submicron particle size analyser from Beckman Coulter Inc.

The porosity in the form of the volume fraction of the pores may be determined by a very wide variety of methods. Mercury porosimetry, for example with a POROTEC Pascal 140, 240 or 440 mercury porosimeter, has proven useful in accordance with the invention. The relative volume of the pores in vol % is reported.

One interesting, preferred embodiment is a combination of at least two different suspension polymers, wherein the one suspension polymer constitutes the porous particles. A further preferred embodiment is the combination with a suspension polymer which from its particle size fills the interstices of the porous scaffolding polymer system of the first particles. This polymer in the interstices is very particularly preferably soluble by the binder system. Dissolution begins more rapidly for soft polymers with low glass transition temperature here than for hard polymers with higher glass transition temperature. Solubility also depends on the properties of the binder. Features of good solvents here are low viscosity and polarity similar to that of the resin to be dissolved.

DETAILED DESCRIPTION OF THE PROCESS AND THE COMPONENTS

The detailed descriptions provided below serve to elucidate a preferred embodiment in terms of the enablement thereof for the production of porous particles. However, these descriptions are not intended to restrict the present invention in any way:

For the suspension polymerization the aqueous phase generally comprises DM water, dispersing assistants and optionally further surface-active substances and also processing aids. With stirring and, depending on the desired particle size, more or less intense shear the drops of monomer mixture are dispersed into this aqueous phase to afford fine droplets and by an external influence such as temperature increase brought to polymerization of the monomer phase. For such a procedure particle size and size distribution of the suspension polymers are in the known order of magnitude in common with commercially available systems.

The production of porous suspension polymers is on the whole known to those skilled in the art even if not for the field of 3-D printing or rapid prototyping. Those skilled in the art may find further, more detailed production procedures in, for example, F. Svec, J. M. J. Frechet, Science 273, 5272 (1996) 205-211,
C. G. Gomez, C. I. Alvarez, M. C. Strumia, B. L. Rivas, P. Reyes, Journal of Applied Polymer Science 79, 5 (2001) 920-927,
D. Horák, F. Ledický, V. Rehák, F. Svec, Journal of Applied Polymer Science 49, 11 (1993) 2041-2050,
O. Okay, ç. Gürün, Journal of Applied Polymer Science 46, 3 (1992) 401-410,
S. Dubinsky, A. Petukhova, I. Gourevich, E. Kumacheva, Chemical Communications 46, 15 (2010) 2578-2580 or in
S. Dubinsky, J. I. Park, I. Gourevich, C. Chan, M. Deetz, E. Kumacheva, Macromolecules 42, 6 (2009) 1990-1994.

Example Procedure

The Aqueous Phase

The aqueous phase consists of DM water (demineralized water), dispersing assistants, processing aids, optionally anti-flow agents, optionally further surface-active substances and additives which are dissolved and/or dispersed in the DM water.

The Dispersing Assistants

The dispersing assistants employed may be inorganic or organic dispersing assistants. The group of inorganic dispersing assistants comprises freshly precipitated and redispersed inorganic particles optionally in combination with further surface-active substances. It is also possible to employ commercial, stable inorganic particle dispersions.

Examples of suitable inorganic dispersers are calcium phosphate, apatite, aluminium hydroxide and other known substances.

Examples of further surface-active substances are surfactants, emulsifiers, wetting agents, defoamers and others.

The group of organic dispersers comprises polymers and oligomers having polar groups optionally with further additives, for example dispersing agents and anti-flow agents, salts and others.

Examples of organic dispersers are inter alia poly(meth)acrylic acid, copolymers of (meth)acrylates and (meth)acrylic acid, polyvinylpyrrolidone, polyvinyl alcohol.

Polyvinyl alcohols may be employed with different molecular weights and degrees of hydrolysis to control particle size and polymer properties. Examples of suitable partially hydrolyzed polyvinyl alcohols are Mowiol 40-88 and Mowiol 4-88. They are employed in amounts between 0.1% and 1%, preferably 0.1% and 0.5%, based on the aqueous phase. Examples of copolymers of (meth)acrylates and (meth)acrylic acid are ammonium and sodium salts of the copolymers of MMA and methacrylic acid. They are employed in amounts between 0.1% and 2%, preferably 0.5% and 1%, based on the aqueous phase.

Examples of further surface-active substances are defoamers. Suitable defoamers include natural and synthetic fatty oils, mineral oils, silicones, modified silicones and mixtures of special fatty acid partial esters. They are employed in amounts of 0.01% to 0.2%, preferably 0.01% to 0.05%. Defoamers prevent the formation of off spec product in the head of foam in the vessel, reduce deposits and improve yield.

Examples of further assistants are pyrogenic oxides of silicon or aluminium. A preferred example of an assistant is pyrogenic silica having a high surface area between 50 and 200 m$^2$/g. Assistants are employed in amounts of 0% to 1%, preferably 0.05% to 0.25%. Assistants such as pyrogenic oxides have favourable effects on production, workup and on the powder properties. Addition of a pyrogenic silica improves for example the stability of the suspension, deposits on the reactor and flowability of the suspension beads.

Examples of salts are sodium sulphate and magnesium sulphate which have a positive effect on crust formation at the reactor edge. They are employed in amounts of 0.05% to 0.5%, preferably 0.1% to 0.3%.

The Organic Phase

The organic phase comprises monomers, polymers, free-radical initiators, crosslinkers, optionally further components.

Pore Formers: Alcohols, Oils, Alkanes

Blowing agents: substances which on decomposition give off gases such as $CO_2$ or $N_2$, for example azo compounds, carboxylic acids, esters or other examples as previously set out hereinabove.

Emulsion polymers, for example (meth)acrylate-based emulsion polymers which are uncrosslinked and easily soluble.

Reactors

Reactors which may be employed include batchwise-operated or continuously operated reactors. The group of batchwise-operated reactors comprises steel reactors, enamel reactors and glass reactors. In one particular embodiment the reactors may also be configured as a stirred tank cascade.

The invention claimed is:

1. A process for producing three-dimensional objects from a powder bed by means of a binder jetting process comprising multiple repetition of the process steps:
   a) selective application of a binder and subsequent or simultaneous hardening of this binder in the powder bed; and
   b) application of a new powder layer on the surface;
   wherein the powder bed comprises at least one type of porous polymer particles, characterized in that these porous particles have a diameter between 10 and 500 µm and in that these porous particles comprise between 5 and 20 vol % of pores.

2. The process of claim 1, wherein the porous particles are polymer particles comprising an initiator suitable for hardening the binder or a catalyst or an accelerator that accelerates hardening.

3. The process of claim 1, wherein the polymer particles comprise a PMMA suspension polymer or MMA copolymer having an average diameter between 30 and 110 µm.

4. The process of claim 1, wherein the porous particles are produced by means of suspension polymerization, wherein the monomer mixture comprises a blowing agent.

5. The process of claim 4, whereon the blowing agent is an alkane, a cycloalkane, an alcohol, an aldehyde, a ketone or another organic substance and in that the blowing agent has a boiling point between 30° C. and 80° C. under standard conditions.

6. The process of claim 4, wherein the blowing agent is a compound which, at a temperature above 80° C., decomposes and thus liberates volatile constituents, and in that the suspension polymerization is performed at a temperature below this decomposition temperature.

7. The process of claim 6, wherein the decomposing compound is isobutyl or tert-butyl (meth)acrylate which is copolymerized with the monomer mixture.

8. The process of claim 4 wherein the monomer mixture further comprises a nucleating agent.

9. The process of claim 1, wherein the porous particles are produced by means of suspension polymerization, wherein the monomer mixture comprises non-crosslinked emulsion polymers having a diameter between 10 and 200 nm and in that the monomer mixture comprises at least one crosslinker.

10. The process of claim 9, wherein, after isolation of the particles, the emulsion polymer is leached out of the polymer particle by means of an organic solvent with accompanying pore formation.

11. The process of claim 10, wherein the emulsion polymer has a glass transition temperature, measured by means of DSC, between 30° C. and 70° C.

12. The process of claim 1, wherein the porous particles are produced by means of suspension polymerization, wherein the monomer mixture comprises wax particles having a diameter between 10 and 100 nm, and in that the monomer mixture comprises at least one crosslinker.

13. The process of claim 1, wherein the pore former employed is an aliphatic or cyclic alkane and in that said alkane is washed out of the particle to achieve pore formation.

14. The process of claim 13, wherein the pore former is cyclohexanol or cyclohexane.

15. The process of claim 1, wherein the powder bed is a combination of at least two different suspension polymers, wherein the first suspension polymer constitutes the porous particles and wherein the second suspension polymer is present in the interstices between the first suspension polymer and has a lower glass transition temperature than the first suspension polymer.

* * * * *